United States Patent
Schibsbye

(10) Patent No.: US 9,102,082 B2
(45) Date of Patent: Aug. 11, 2015

(54) MOULD ASSEMBLY AND METHOD OF CLOSING A MOULD ASSEMBLY

(75) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/810,996

(22) PCT Filed: Feb. 7, 2011

(86) PCT No.: PCT/EP2011/051726
§ 371 (c)(1),
(2), (4) Date: Jan. 18, 2013

(87) PCT Pub. No.: WO2012/010331
PCT Pub. Date: Jan. 26, 2012

(65) Prior Publication Data
US 2013/0119582 A1    May 16, 2013

(30) Foreign Application Priority Data
Jul. 21, 2010   (EP) .................................. 10007577

(51) Int. Cl.
*B29C 33/26* (2006.01)
*B29C 31/00* (2006.01)
*B29C 33/34* (2006.01)
*B29C 33/22* (2006.01)

(52) U.S. Cl.
CPC ............... *B29C 33/26* (2013.01); *B29C 31/006* (2013.01); *B29C 33/34* (2013.01); *B29C 33/22* (2013.01)

(58) Field of Classification Search
CPC ...... B29C 31/006; B29C 33/20; B29C 33/22; B29C 33/26; B29L 2031/082
USPC ............ 249/137, 139; 414/590; 425/589, 237
See application file for complete search history.

(56) References Cited

U.S. PATENT DOCUMENTS

| | | | |
|---|---|---|---|
| 2,228,123 A | 1/1941 | McMurray |
| 3,621,535 A | 11/1971 | Ringdal |
| 4,080,129 A | 3/1978 | Little |
| 4,521,354 A | 6/1985 | Engelke |
| 4,560,335 A | 12/1985 | Cordova |
| 4,648,921 A | 3/1987 | Nutter, Jr. |
| 6,514,061 B1 | 2/2003 | Hudson |

(Continued)

FOREIGN PATENT DOCUMENTS

| | | |
|---|---|---|
| CN | 100566983 C | 12/2009 |
| DE | 2109934 A1 | 9/1972 |

(Continued)

*Primary Examiner* — Joseph S Del Sole
*Assistant Examiner* — Lawrence D Hohenbrink, Jr.

(57) ABSTRACT

A mold assembly includes a first mold part with a first mold opening and a second mold part with a second mold opening. The first mold part and the second mold part are separate parts. A rotating device rotates the second mold part from a position in which the second mold opening faces upwards to a position in which the second mold opening faces downwards. A moving device moves the first mold part and/or the second mold part relative to each other such that the second mold part is located above the first mold part. A closing device moves the first mold part and the second mold part towards each other with the first and second mold openings facing each other until the first and second mold parts engage. Further, a method of closing a mold assembly is provided.

9 Claims, 2 Drawing Sheets

(56) References Cited

U.S. PATENT DOCUMENTS

| | | |
|---|---|---|
| 2006/0034971 A1* | 2/2006 | Olsen et al. ............... 425/451.5 |
| 2006/0177540 A1* | 8/2006 | Lichtinger ..................... 425/589 |
| 2011/0020131 A1* | 1/2011 | Petersen et al. ............... 416/226 |
| 2011/0308703 A1* | 12/2011 | Ossanai ......................... 156/93 |

FOREIGN PATENT DOCUMENTS

| | | |
|---|---|---|
| DE | 102008046573 B3 | 8/2009 |
| DK | 171948 B1 | 8/1997 |
| EP | 0037987 A2 | 10/1981 |
| EP | 1695813 A1 | 8/2006 |
| EP | 2230070 A1 | 9/2010 |
| EP | 2275673 A1 | 1/2011 |
| FR | 2743747 A1 | 7/1997 |
| GB | 1185510 A | 3/1970 |
| GB | 2105633 A | 3/1983 |
| GB | 2325879 A | 12/1998 |
| WO | WO 2004043679 A1 | 5/2004 |
| WO | WO 2007054088 A1 | 5/2007 |
| WO | WO 2008104174 A2 * | 9/2008 |

* cited by examiner

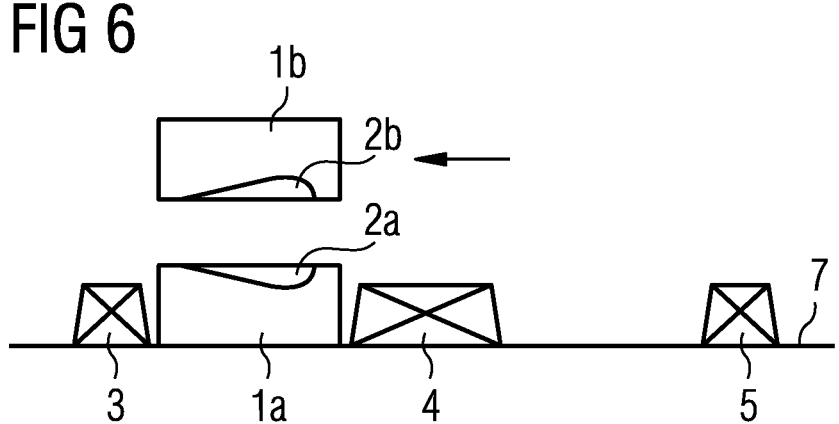
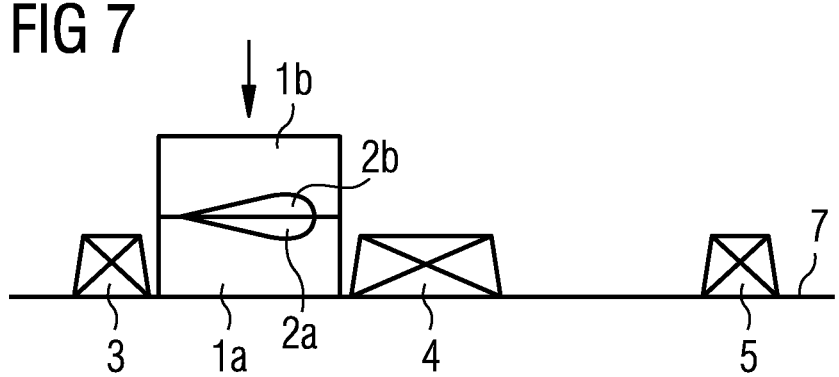
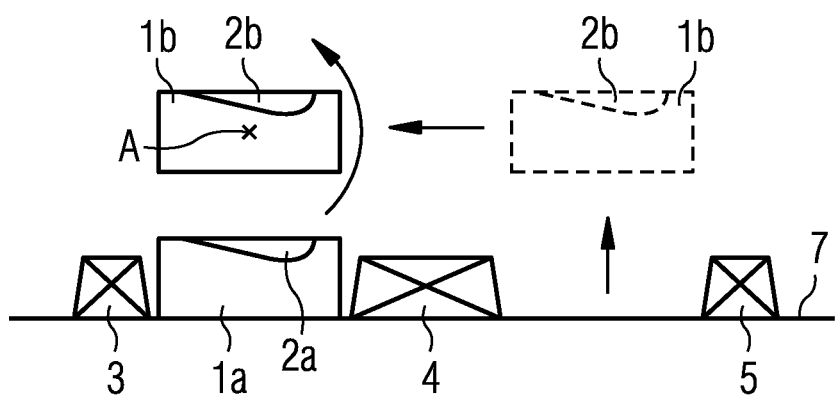

MOULD ASSEMBLY AND METHOD OF CLOSING A MOULD ASSEMBLY

CROSS REFERENCE TO RELATED APPLICATIONS

This application is the US National Stage of International Application No. PCT/EP2011/051726 filed Feb. 7, 2011, and claims the benefit thereof. The International Application claims the benefits of European Patent Application No. 10007577.9 EP filed Jul. 21, 2010. All of the applications are incorporated by reference herein in their entirety.

FIELD OF INVENTION

The present invention relates to a mould assembly, in particular to a mould assembly for a wind turbine rotor blade, and to a method of closing a mould assembly, in particular of closing a mould assembly for a wind turbine rotor blade.

BACKGROUND OF INVENTION

Known from the art of making wind turbine rotor blades is to manufacture separate parts (e.g. two half shells) of the blade in separate moulds and, at the end of the process, to close the mould parts together to form a full rotor blade. Subsequently, resin may be injected in the blade composite material situated in the enclosure formed by the mould parts. The mould parts may be closed about a longitudinal hinge line were a crane is used to lift one of the mould parts about the hinge line thereby forming a movement along a single arc. DK 171948 B discloses one example thereof.

WO 2007/054088 A1 discloses another method for closing a mould assembly. In this method, a double hinged pivotable mechanism allows one of the mould parts to move along two circular arcs instead of only a single one during a rotation process of the mould part which leads to closing a mould.

WO 2004/043679 A1 discloses another method for closing a mould assembly with a first and a second mould part. In this method, a hinge mechanism allows the second mould part to move along an arc into a partly closed position. The second mould part is then moved to engage the first mould part by a displacement means for a rectilinear translational movement of the second mould part.

As wind turbine rotor blades have become increasingly larger over the years the necessity for working personal to access the open mould parts from both sides for layout of, e.g., glass fibre material in the mould have increased.

One issue related to the prior art of blade manufacturing is that during the process of closing the mould parts the work space between the moulds is interfered and, e.g. walkways, scaffolds, etc. may have to be removed before the closing operation.

Another issue related to the prior art is that it is difficult to join the separated composite material in the moulds simultaneously whereby some parts of the material may be dislocated in relation to others. This in turn may induce, e.g., wrinkles along the edges of the joined edges of the composite material introducing weak structure points.

SUMMARY OF INVENTION

It is, therefore, an objective of the present invention to provide an advantageous mould assembly and an advantageous method of closing a mould assembly.

These objectives are solved by a mould assembly and a method of closing a mould assembly according to the independent claims. The depending claims contain further developments of the invention.

An inventive mould assembly comprises:
a first mould part with a first mould opening,
a second mould part with a second mould opening where the second mould part is a separate part in relation to the first mould part, i.e. they are not connected by a hinge mechanism;
a rotating means for rotating at least the second mould part from a position in which the second mould opening faces upwards to a position in which the second mould opening faces downwards;
a moving means for moving the first mould part and/or a second mould part relative to each other to a position where the second mould part is located above the first mould part, the moving means being designed for moving the first mould part and/or the second mould part upward and/or horizontally along a path comprising at least one linear vertical path section, and
a closing means for moving the first mould part and the second mould part towards each other with the first and second mould openings facing each other until the first and second mould parts engage.

The inventive mould assembly allows to position the second mould part with its opening facing downwards on top of the first mould part so that the mould parts will meet/engage along a straight pathway instead of along an arc or two arcs as it is known from the prior art. This in turn ensures that all the contact areas of the composite material in the mould parts are joined simultaneously and no wrinkles in the composite material are introduced. Furthermore, moving a mould part upwards along a linear vertical path section when bringing it into a position that allows the mould parts to meet/engage along a straight pathway allows to rotate the mould part after bringing it into a position in which the rotation is not hindered by walkways, scaffolds, etc. positioned nearby the mould parts and, in particular, between the mould parts. A horizontal movement along a linear path section allows a mould part to pass over any walkway, scaffold, etc. positioned between the mould parts. Therefore, scaffolds, etc. positioned between the mould parts do not hinder the rotation and/or movement of the mould parts relative to each other. The need to remove walkways, scaffolds, etc. positioned near the mould parts, in particular between the mould parts, before closing the mould can therefore be overcome.

With the inventive method it is advantageous to assure that at least the blade composite material situated in the mould opening of the second mould part is held in place when the mould part is rotated 180° around an axis running through the centre of gravity so that it does not drop out of the mould part. Therefore, the second mould part may comprise a securing means for securing a composite material in the second mould opening. Such a securing means may, e.g., a means for mechanical fastening like brackets, clamps or similar means, a means for applying vacuum between the composite material situated in the mould opening and the mould part, or a cover for covering the composite material situated in the mould opening, etc. Note that different securing means may also be combined for holding the composite material in the mould opening.

Furthermore, the mould assembly may comprise a support assembly for supporting at least the second mould part. This support assembly my provide guidance during moving and/or rotating the mould part(s).

The issues mentioned above with respect to the state of the art are, in particular, present when forming large composite structures like wind turbine rotor blades. Hence, the inventive mould assembly is particularly suitable for forming wind turbine rotor blades. In this case, the first mould part and the second mould part together constitute a negative form of a wind turbine rotor blade. In particular, the first mould part and the second mould part together may constitute a negative form of a wind turbine rotor blade with a root section in which the first mould part and second mould part each comprise a blade root mould section. If a support assembly as previously mentioned is present this support assembly may be connected to the blade root mould section of at least the second mould part. This support assembly may in particular be prepared to guide the second mould part in a pre-established horizontal and vertical direction and prepared to allow a 180° rotation of the second mould part. Hereby, it is ensured that the second mould part, when moved, takes the predetermined path which in turn ensures that the mould does not collide with walkways, scaffolds, etc. which are established around the initial position of the second mould part, i.e. the position where the composite material is laid up in the mould opening so as to form a first blade shell part.

For moving at least the second mould part a crane may be present in the mould assembly. By using the crane together with the support assembly it is ensured that the second mould part, when it is moved, takes a desired path so that the mould part does not collide with walkways, scaffolds, etc. which are established around the initial position of the second mould part.

In the inventive method of closing a mould assembly, in particular a mould assembly for a wind turbine rotor blade, comprising a first mould part with a first mould opening and a composite material situated therein, and a second mould part with a second mould opening and a composite material situated therein, wherein the first mould part and the second mould part are separate parts, i.e. they are independent of each other and not connected by a hinge mechanism, and positioned in first and second positions respectively with the first and second mould openings facing upwards, the following steps are performed:
  the second mould part is rotated by 180° so that the second mould opening faces downwards after the rotation;
  the first mould part and the second mould part are moved relative to each other to a position where the second mould part is located above the first mould part and the first wherein moving the first mould part and the second mould part relative to each other comprises an upward and/or horizontal movement along at least one linear path section; and
  The mould is closed by moving the first mould part and the second mould part towards each other with the first and second mould opening facing each other until the first and second mould parts engage. Moving the mould parts together may be done by lowering the second mould part and/or raising the first mould part.

The inventive method is advantageous in that the step of positioning the second mould with its opening facing downwards on top of the first mould can be performed so that the mould parts will meet/engage along a straight pathway instead of along an arc as known from the state of the art. This in turn ensures that the composite material in the mould parts is joined simultaneously and no wrinkles in the composite material are introduced. Moving a mould part upwards along a linear path section when bringing it into a position that allows the mould parts to meet/engage along a straight pathway allows to rotate the mould part after bringing it into a position in which the rotation is not hindered by walkways, scaffolds, etc. positioned nearby the mould parts and, in particular, between the mould parts. A horizontal movement along a linear path section allows a mould part to pass over any walkway, scaffold, etc. positioned between the mould parts. Therefore, scaffolds, etc. positioned between the mould parts do not hinder the rotation and/or movement of the mould parts relative to each other. The need to remove walkways, scaffolds, etc. positioned near the mould parts, in particular between the mould parts, before closing the mould can therefore be overcome. According to the inventive method, the rotational movement and the linear movement can be done separately, i.e. in separate movements which are, in particular, not coupled to any of the respective other movements. In particular, rotating the second mould part, moving the first mould part and the second mould part relative to each other, and closing the mould can be done separately.

In particular, the second mould part is rotated by 180° after it has been lifted in vertical position above its original position. Due to this development of the inventive method it is ensured that the transfer of the second mould part from a first place with its opening facing upwards to a second place on top of the first mould with its opening facing downwards does not collide with walkways, scaffolds, etc. which are typically established on one or both sides of the second mould part. For various embodiments of the invention, the pathway that the second mould part takes for the set transfer may be altered and adapted to avoid collision for even altered or changed setups of the side walkways and scaffolds.

Furthermore, the second mould part may be lifted to a position in which is lower surface is higher than the upper surface of the first mould part. In other words, the method comprises the further step of lifting the second mould part in a vertical direction from a first position to a second position, the second position being higher than the upper surface of the first mould part.

By lifting the second mould part in vertical direction it is ensured that the second mould part can pass above the surface of the first mould part during positioning without further lifts in vertical direction.

The inventive method may be implemented such that the first mould part and the second mould part are moved relative to each other to positions were the second part is located above the first mould part by moving the second mould part to a position above the first mould part which remains in the first position. In addition, horizontally moving the first mould part and the second mould part relative to each other may be performed after the second mould part has been rotated by 180°. Alternatively, the first mould part and the second mould part may be moved horizontally relative to each other before the second mould part is rotated by 180°. As a further alternative, it is also possible to perform the movement and the rotations simultaneously.

To prevent the composite material from falling out of the mould part when the mould part is moved and/or rotated the composite material situated in the first mould opening and/or the composite material situated in the second mould opening may be held in place by mechanical fastening like, for example, clamps, brackets, etc., and/or by applying a vacuum between the composite material and the mould part, and/or by covering the composite material. Note that also combinations of two or more ways of holding the composite material in place may be combined.

Further features, properties and advantages of the present invention will become clear from the following description of embodiments in conjunction with the accompanying drawings.

BRIEF DESCRIPTION OF THE DRAWINGS

FIG. 6 schematically shows, for the first embodiment of the invention, the mould assembly of according to a fourth step of the inventive method.

FIG. 7 schematically shows, for the first embodiment of the invention, the mould assembly according to a fifth step of the inventive method.

FIG. 8 schematically shows, for a second embodiment of the invention, an alternative mode of moving and rotating a mould part.

DETAILED DESCRIPTION OF INVENTION

Figure 1:
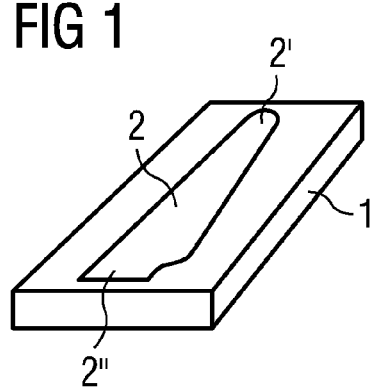
FIG. 1 schematically shows a mould part for a wind turbine rotor blade.

FIG. 1 schematically illustrates a mould part 1 for casting a wind turbine rotor blade. The mould part 1 comprises a mould opening 2 which is an impression of the surface of a half shell of a wind turbine rotor blade to manufacture. As can be seen from FIG. 1, the mould part 1 comprises a tip section 2' and a root section 2" which are impressions of the tip section and the root section, respectively, of the blade to be formed.

Figure 2:
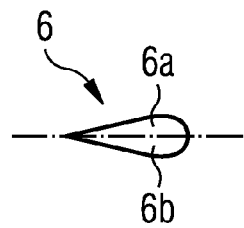
FIG. 2 schematically shows a view of two connected blade shells.

A mould for casting a wind turbine rotor blade further comprises a second mould part. The second mould part is very similar to the first mould part and also comprises an impression of the surface of a half shell of the blade to manufacture. Both mould parts together constitute a negative form of the blade to be manufactured when the mould is closed. A blade 6 made of a shell consisting of a first half shell 6a and a second half shell 6b is shown in FIG. 2 in sectional view. While the first half shell 6a is formed by the impression of the first mould part the second half shell 6b is formed by the impression of the second mould part.

When forming the rotor blade, layers of fibre material are laid in the mould openings so as to form a layer stack. Then the mould is closed and a curable material like a resin is introduced into the layer stack and cured so as to form a laminate composite. During resin infusion and curing of the resin a mould core may be present which is enclosed by the two mould parts so that the layer stack of fibre material is located between the mould core on the one side and one of the mould part on the other side.

A mould assembly suitable for manufacturing an elongated fibre reinforced wind turbine rotor blade comprises:
 a first mould part with at least one mould opening,
 a second mould part with at least one opening, where the mould part is prepared for:
  being rotated at least 180° around the centre axis of gravity of the mould part, i.e. a horizontal axis running through the centre of gravity of the mould part, and
  being moved to a position directly above the first mould part, where the openings of the two mould parts face each other.

In a first aspect of the inventive mould assembly, the second mould part further is prepared for being engaged with the second mould part. Hereby it is ensured that the composite material positioned in the openings of the mould parts can be joined together.

Furthermore, the invention relates to a method for closing a mould assembly, where said assembly comprises a first mould part and a second mould part, and where the two mould parts are positioned with the openings of the mould parts facing substantially upwards, the method comprising the steps of:
 rotating the second mould part 180° around the centre axis of gravity of the mould part so that its opening is facing substantially downwards,
 moving the second mould part to a position directly above the first mould part where the openings of the two mould parts face each other, and
 lowering the second mould part and/or rising the first mould part until the first and second mould parts engage.

A first embodiment of the inventive method will now be described with respect to FIGS. 3 to 7.

Figure 3:
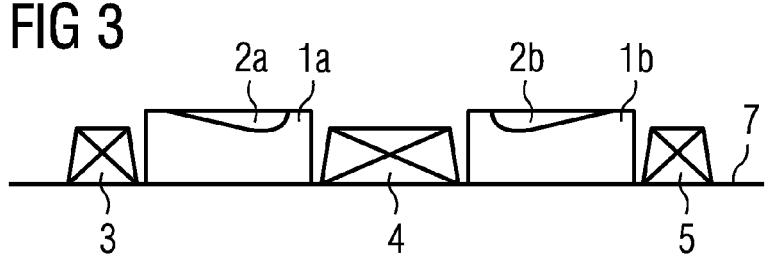
FIG. 3 schematically shows an open mould assembly according to a first step of the inventive method.

FIG. 3 schematically illustrates an open mould assembly according to a first step of the inventive method. Here, a first mould part 1a and second mould part 1b are positioned such as on a factory floor 7. The mould parts 1a, 1b are positioned with their openings 2a, 2b upwards, so that a composite material can be a freely laid up in the mould parts 1a, 1b. Around the mould parts 1a, 1b walkways 3, 4, 5 are positioned which allow working personal to freely access the mould parts 1a, 1b from all sides. In addition or as an alternative to walkways, scaffolds may be present around the mould parts 1a, 1b.

When the mould parts 1a and 1b are in the configuration shown in FIG. 3 the layers of fibre material are laid into the mould openings 2a, 2b. To secure the layer stacks laid in the mould openings 2a, 2b clamps are used, at least for the second mould part 1b, which is the mould part which will move in the method according to the embodiment of the inventive method. Alternatively, or additionally to clamping, the layer stack may also be secured by applying vacuum between the layer stack and the mould or by covering the layer stack laid in the opening 2b, e.g. by a mould core. The mould core can, in turn, be secured to the mould part 1b by clamps, brackets or the like.

Figure 4:
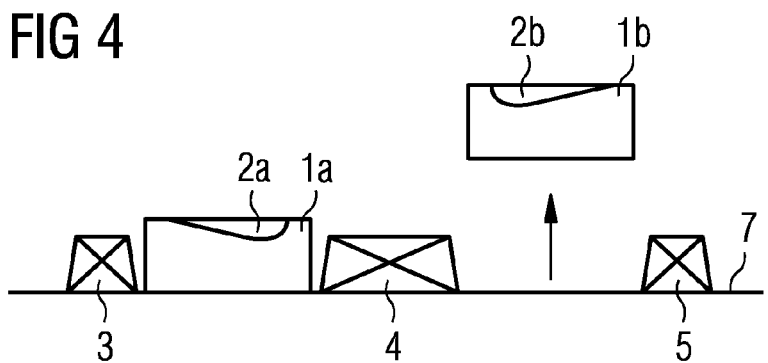
FIG. 4 schematically shows the mould assembly according to a second step of the inventive method.

FIG. 4 schematically illustrates the mould assembly according to a second step of the inventive method. Here, the second mould part 1b has been lifted in vertical direction along a path with at least a linear path section, as indicated by an arrow in the Figure. Hereby, the mould part 1b can be lifted to a vertical position were it is above walkways 4, 5 and whereby the mould part 1b can be moved freely in horizontal direction without colliding with said walkways 4, 5.

Figure 5:
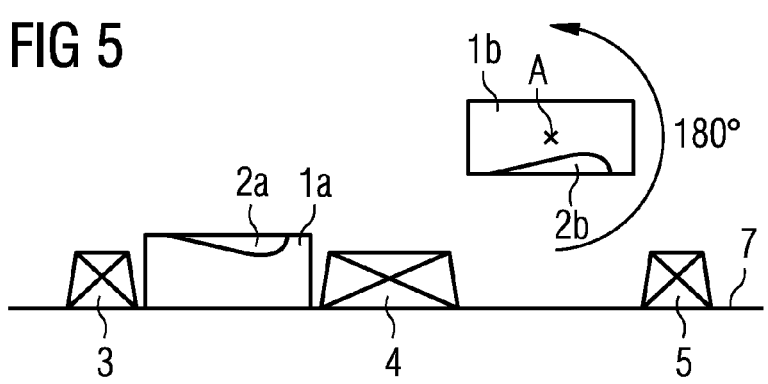
FIG. 5 schematically shows, for a first embodiment of the invention, the mould assembly according to a third step of the inventive method.

FIG. 5 schematically illustrates the mould assembly according to a third step according to a first embodiment of the inventive method. Here, the second mould part 1b is rotated by 180° around a centre axis of gravity A of the mould part 1b (which is in the present embodiment a horizontal axis running through the centre of gravity) as illustrated by the arrow in the Figure, so that its opening 2b now is facing substantially downwards.

FIG. 6 schematically illustrates the mould assembly according to a fourth step of the first embodiment of the inventive method. Here, the second mould part 1b is moved to a position directly above the first mould part 1a so that the openings 2a, 2b of the two mould parts 1a, 1b face each other. In particular, the second mould part 1b may be moved along path with at least one linear horizontal path section so as to assure that the second mould part 1b stays above the walkways, scaffolds, etc. 3, 4, 5 located between the mould parts 1a, 1b.

FIG. 7 schematically illustrates the mould assembly according to a fifth step of the inventive method. Here, the second mould part 1b is lowered until the first and second mould parts 1a, 1b engage. In alternative embodiments of the invention, the engagement of the mould parts 1a, 1b may be achieved by raising the first mould part 1a in vertical direction, or by a combination of raising the first mould part 1a and lowering the second mould part 1b. When the mould parts 1a, 1b engage the mould is closed and a resin infusion can take place to form the composite laminate.

Opening the mould after curing the laminate can be done by performing the steps shown in FIGS. 3 to 7 in a reverse fashion. The finished wind turbine rotor blade thereby remains in the first mould part 1a due to the weight of the blade and, if present, the mould core still being inside the rotor blade.

As can be seen from FIGS. 3 to 7, all method steps of the inventive method can be performed without influencing the positioning of the walkways and/or scaffolds. Furthermore, it can be seen that in the step of joining the two mould parts 1a, 1b to engage, i.e. in the step of closing the mould, the mould parts are following a straight direction instead of an arc as known from the prior art.

An alternative embodiment of the inventive method of closing a mould is schematically shown in FIG. 8. In this alternative embodiment, instead of raising the second mould part 1b, turning the second mould part 1b and moving the second mould part 1b to a position above the first mould part 1a after it has been turned, the second mould part 1b is lifted in vertical direction along at least a section linear path and then moved along at least a section of a horizontally linear path to a position above the first mould part 1a. After it has been moved to the position above the first mould part 1a the second mould part 1b is rotated by 180° about a horizontal axis A running through the centre of gravity of the second mould part 1b. The height of the second mould part during rotation is chosen such that the first mould part 1a does not hinder the turning of the second mould part 1b. After the second mould part 1b has been rotated by 180° the method according to the second embodiment continuous with closing the mould in the same fashion as it has been described with respect to FIG. 7.

For moving the second mould part, a crane is used throughout the embodiments. Furthermore, a support assembly is connected to the root end 2" of at least one of the mould parts 1a, 1b, i.e. to the end at which the impression of the root section 2" of the blade to be formed is located. In the described embodiments, the support assembly is prepared to guide the second mould part 1b in a pre-established horizontal and vertical direction and also prepared to allow a 180° rotation of the second mould part. A rotation mechanism for rotating the second mould part 1b may be integrated in the support assembly. By use of the crane and the support assembly it can be ensured that the second mould part, when being moved, takes a desired path so that the mould part does not collide with walkways, scaffolds, etc. which are established around the initial position of the second mould part.

The invention claimed is:

1. A mould assembly, comprising:
    a first mould part with a first mould opening to form a first half shell of a wind turbine blade;
    a second mould part with a second mould opening to form a second half shell of the wind turbine blade, wherein the second mould part is a separate mould part in relation to the first mould part, the first mould part and the second mould part together constitute a negative form of a wind turbine rotor blade;
    a rotating device for rotating the second mould part from a first position in which the second mould opening faces upwards to a second position in which the second mould opening faces downwards;
    a crane for moving the second mould part relative to first mould part such that the second mould part is located above the first mould part, wherein the crane is configured for moving the second mould part upwards along a linear path and horizontally along linear path; and
    a support assembly for supporting the second mould part, the support assembly comprising the rotating device.

2. The mould assembly as claimed in claim 1, wherein the second mould part comprises a securing device for securing a composite material in the second mould opening.

3. The mould assembly as claimed in claim 2, wherein the securing device comprises means for mechanical fastening and/or means for applying vacuum between the composite material and the mould part and/or a cover for covering the composite material.

4. The mould assembly as claimed in claim 1, wherein the support assembly comprises guiding means for guiding the second mould part when rotated and/or moved.

5. The mould assembly as claimed in claim 1,
    wherein the first mould part and the second mould part together constitute a negative form of a wind turbine rotor blade with a blade root section, wherein the first and the second mould parts each comprise a blade root mould section; and
    wherein a support assembly is connected to the blade root mould section of the second mould part.

6. The mould assembly as claimed in claim 1, wherein the rotating device is configured to rotate the second mould part around an axis running through the center of gravity of the second mould part.

7. The mould assembly as claimed in claim 1, wherein the crane is configured to place the second mould part onto the first mould part such that contact areas of a composite in the second mould part are joined to contact areas of a composite in the first mould part by a linear pathway.

8. The mould assembly as claimed in claim 7, wherein contact areas of the composite in the second mould part are joined simultaneously to the contact areas of the composite in the first mould.

9. The mould assembly as claimed in claim 1, wherein the separate mould parts are not connected via a hinge.

* * * * *